Figure 1:
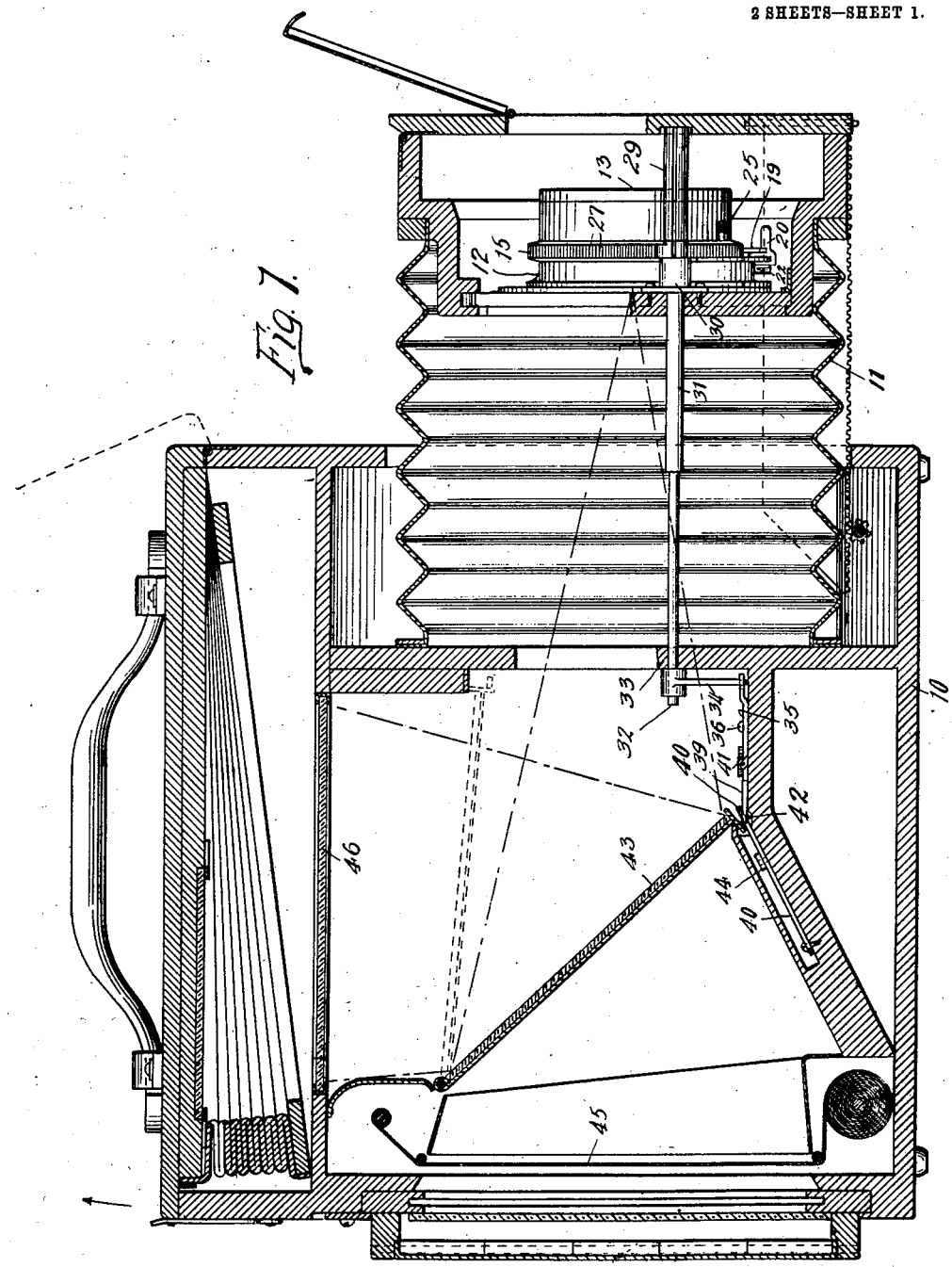

D. E. FELT.
DIAPHRAGM CONTROLLER FOR CAMERAS.
APPLICATION FILED JAN. 2, 1908.

907,486.

Patented Dec. 22, 1908.

2 SHEETS—SHEET 1.

Witnesses:
Wm. Geiger
H. M. Munday

Inventor
Dorr E. Felt
By Munday, Evarts, Adcock & Clark,
Attorneys

D. E. FELT.
DIAPHRAGM CONTROLLER FOR CAMERAS.
APPLICATION FILED JAN. 2, 1908.
907,486.
Patented Dec. 22, 1908.
2 SHEETS—SHEET 2.
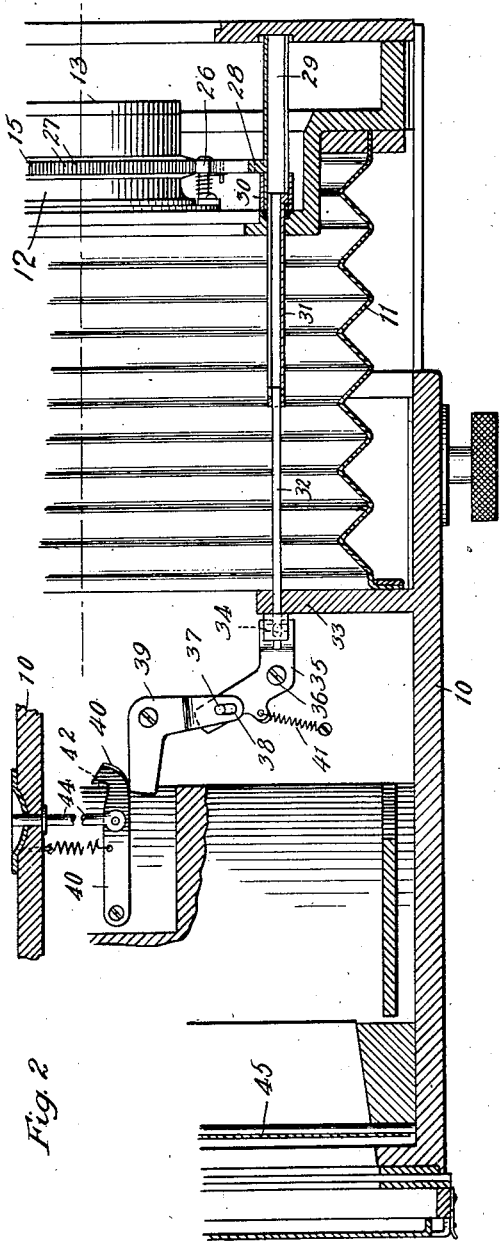
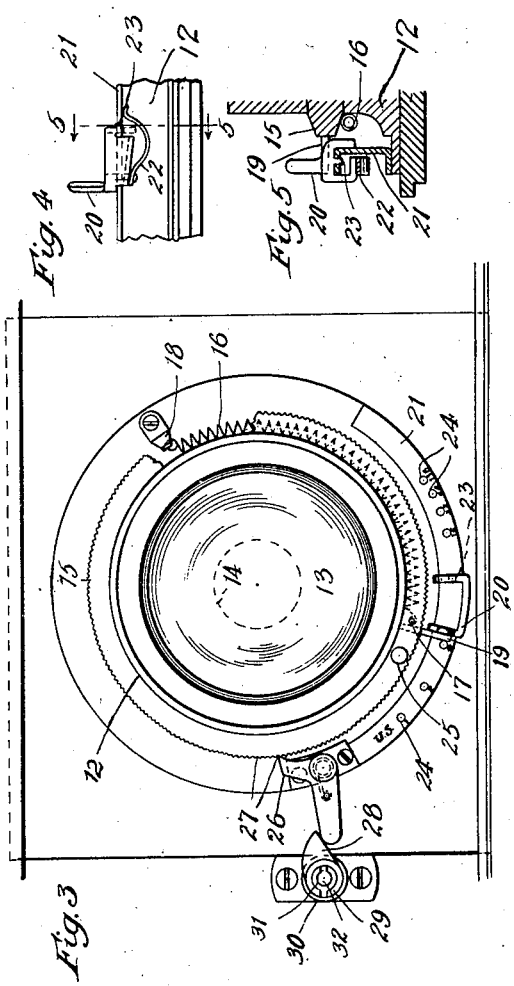
Witnesses:
Wm. Geiger
Inventor:
Dorr E. Felt
By Munday, Evarts, Adcock & Clarke.
Attorneys

UNITED STATES PATENT OFFICE.

DORR E. FELT, OF CHICAGO, ILLINOIS.

DIAPHRAGM-CONTROLLER FOR CAMERAS.

No. 907,486.　　　　　Specification of Letters Patent.　　　Patented Dec. 22, 1908.

Application filed January 2, 1908. Serial No. 409,020.

*To all whom it may concern:*

Be it known that I, DORR E. FELT, a citizen of the United States, residing in Chicago, in the county of Cook and State of Illinois, have invented a new and useful Improvement in Diaphragm-Controllers for Cameras, of which the following is a specification.

My invention relates to devices for controlling the diaphragm-aperture in photographic cameras.

The invention has for an object the providing of mechanism whereby the operator may first set an adjustment to predetermine a reduced aperture for the exposure and yet thereafter utilize a large aperture, and the consequent fuller illumination for the focusing operation; and it has for further objects such other improvements in structure or function as may be found to obtain in the devices hereinafter described or claimed.

The invention is primarily applicable to and useful in the type of camera known as the reflex or "Graflex", which is especially used for taking instantaneous views of moving objects. In such camera there is provided a focusing device whereby an exact view of the intended subject is presented on a ground glass focusing plate at the instant immediately before the exposure is made; but a large aperture and the fullest possible illumination is requisite to a clear definition of the subject upon such focusing plate, while a much reduced aperture may be found to be requisite to a proper definition of the subject on the sensitized plate or film, and yet it is generally impossible, and always inconvenient, to change the ordinary aperture adjustment immediately following the instant of focusing and before the instant of exposure.

In the accompanying drawings, forming a part of this specification, Figure 1 is a longitudinal, vertical sectional view of a Graflex camera with an embodiment of my invention therein; Fig. 2 is a partial horizontal sectional view of the same showing a plan view of the operating connections of the diaphragm-controller; Fig. 3 is a plan view of the lens and diaphragm mounting, showing the devices immediately controlling the diaphragm aperture; Fig. 4 is a detail of the adjustment device to predetermine the reduced aperture for the exposure; and Fig. 5 is a cross section on line 5—5 of Fig. 4. Like reference numerals indicate like parts in all the figures.

10 is the frame of the camera, provided with adjustable bellows 11, having on its front board the barrel mounting 12 of the lens 13 and iris diaphragm 14. Said diaphragm is normally controlled by the milled ring 15, by whose rotation the operator may set the diaphragm to any desired aperture. A coiled spring 16 has its respectively opposite ends secured to a stud 17 in the said rotary ring and a stud 18 in the stationary barrel mounting of the lens and diaphragm, and the said studs are so disposed that the tension of the said spring constantly tends to draw the ring around into position to reduce and close the diaphragm aperture. To predetermine the extent to which the said aperture may be so reduced, the ring 15 is provided with a stud 19 adapted to engage a movable clip 20 that is adjustable to various positions on the curved rib 21 that projects from the base of the lens and diaphragm mounting. Said movable clip is so formed as to embrace the upper edge of said rib and the spring 22 tends to hold its bent tip 23 in any one of the holes 24 with which said tip may engage as the clip is slid along the aforesaid rib. After the setting of this movable clip has determined the extent to which the diaphragm aperture may be reduced for the purposes of the intended exposure, the operator may take hold of either the milled edge or the finger stud 25 and turn the ring 15 sufficiently to open the diaphragm to its greatest aperture, and when so moved the said ring will be held, against the tension of the spring 16, by the engagement of the pawl-end of the trigger 26 in the notch 27 in the edge of the said ring. It will be observed that the aforesaid reducing means, together with the adjusting and setting means, are mounted upon and self-contained with the barrel mounting of the lens and diaphragm, so that the entire device may be readily detached from the front-board of the camera bellows, or the reducing means may be readily applied to the ordinary barrel-mounting of the lens and diaphragm. The trigger 26 is tripped by the contact of its other end with the lug 28 on the oscillating tubular shaft 29 that is journaled and supported in the bracket 30 fixed in the front framework of the camera bellows. And the tripping of said trigger effects, in obvious manner, the instant closing of the diaphragm from its greatest aperture to the aforesaid predetermined reduced aperture. Such reduction of the aperture is designed to be effected in the instant intermediate the focusing operation and the exposure, and the necessary oscillation of the tubular shaft 29 is accomplished by the following described mechanism. Telescoped within said tubular shaft 29 is the smaller tubular shaft 31, and within the latter is telescoped the rod 32, said rod being slidably keyed to said tubular shaft 31 and the latter being slidably keyed to the oscillating tubular shaft 29, so that the inner shaft and rod may be drawn back to any extent to accommodate the extension of the camera bellows, the rear end of the rod 32 being journaled and secured in the partition 33 vertically transverse of the frame of the camera. Said rear end of said rod is provided with a downwardly projecting arm 34 engaged in the forked end of the bell-crank lever 35, pivoted at 36 to the bottom of the frame of the camera, the oscillation or rocking of said rod and its connected tubular shaft being effected by the movement of the said bell crank lever. Said bell-crank lever has in its other arm the upwardly projecting stud 37 engaged in the slot 38 in the arm of the accessory bell-crank lever 39; and the other arm of the said bell-crank lever 39 is adapted to be engaged by the back of the mirror-release trigger 40 and is held against such trigger by the spring 41. This trigger 40 engages the stud 42 in the forward edge of the focusing mirror 43 and is adapted to release said mirror at the instant when the operator has concluded the focusing of the intended subject. The said trigger is released by the direct action of the push-button rod 44. When so released, the focusing mirror is drawn up from in front of the focal plane by the springs controlling it, and at the instant of reaching its raised position the said mirror trips the focal-plane shutter 45 that effects the exposure of the sensitized plate or film.

It is obvious that the tripping of the diaphragm-controlling mechanisms above described will be simultaneous with the tripping of the focusing mirror, being effected by one and the same movement of the mirror-release trigger 40, and so the diaphragm aperture will be reduced to the required extent by the time that the complete raising of the mirror trips the focal-plane shutter to make the exposure. It is also obvious that the aforesaid diaphragm controlling mechanisms are entirely released independently of and before any actual displacement or moving of the displaceable focusing mirror, so that the instantaneous and automatic spring operation of the reducing means may effect the reducing of the diaphragm aperture before there is any possibility of the light rays being admitted toward the sensitive focal plane by the displacement of the focusing mirror, and also so that any shock or jar incident upon the operation of the aperture-reducing means may be dissipated substantially before there is any possibility of an exposure of the sensitized plate. And the focusing mirror itself is also relieved from all strain that might result in its distortion during the focusing operation if the controller for the diaphragm reducing means were latched directly to said mirror instead of being tripped by a trigger that is itself independent of said mirror. The operator may first adjust the diaphragm for such reduced aperture as may be best adapted to give the required definition or focal depth or other quality in the image upon the sensitized plate or film, under the particular conditions obtaining at the time of the intended exposure, and then after making such adjustment he may set the diaphragm at a greater or its largest aperture so as to obtain full illumination and clear delineation of the subject upon the ground glass, 46, during the focusing operation, and the instant that he has obtained a view of the subject upon the ground glass focusing plate, the same pressure of the operating button that effects the displacement of the focusing mirror and the exposure of the sensitized plate or film, also effects the required reduction of the diaphragm aperture just before the instant of such exposure. Without the application of the device of my invention to the camera, the operator would be unable to effect, in a practical manner, a reduction of the diaphragm aperture instantly that the focusing is effected and without delaying the immediately following instant of exposure.

My invention is hereinabove set forth as embodied in one particular form of construction, but I do not limit it thereto or to less than all the possible forms of construction in which said invention as hereinafter claimed may be embodied and distinguished from prior devices for similar purposes.

I claim:—

1. In a photographic camera, in combination, an adjustable diaphragm, means adapted to reduce the aperture thereof, an adjustment for predetermining a reduced aperture during the exposure, means for setting said diaphragm at a greater aperture to give fuller illumination during focusing, displaceable focusing mechanism, and a controller, released automatically before the displacement of the focusing mechanism, to actuate the reducing means instantly after the focusing and before the exposure, substantially as specified.

2. In a photographic camera, in combination, focusing mechanism having a displaceable member in the path of the rays from the lens, an adjustable diaphragm, means adapted to reduce the aperture thereof, an adjustment for predetermining a reduced aperture during the exposure, means for setting said diaphragm at a greater aperture to give fuller illumination during focusing, and a controller to actuate the reducing means instantly after the focusing and before the exposure, said controller being adapted to be released before but operated by the same manual impulse that effects the displacement of said member of the focusing mechanism, substantially as specified.

3. In a photographic camera, in combination, focusing mechanism having a displaceable member in the path of the rays from the lens, an adjustable diaphragm, means adapted to reduce the aperture thereof, an adjustment for predetermining a reduced aperture during the exposure, means for setting said diaphragm at a greater aperture to give fuller illumination during focusing, and a controller, released before but operated at one movement with the displacement of said member of the focusing mechanism, to actuate the reducing means instantly after the focusing and before the exposure, substantially as specified.

4. In a photographic camera, in combination, focusing mechanism having a displaceable member in the path of the rays from the lens, an adjustable diaphragm, means adapted to reduce the aperture thereof, an adjustment for predetermining a reduced aperture during the exposure, means for setting said diaphragm at a greater aperture to give fuller illumination during focusing, and a controller released before but operated by the displacement of the said member of the focusing mechanism, to actuate the reducing means instantly after the focusing and before the exposure, substantially as specified.

5. In a photographic camera, in combination, focusing mechanism having a displaceable member adapted to direct the image from the lens into a plane apart from the plane of the sensitized surface, mechanism for exposing the sensitized surface, an adjustable diaphragm, means adapted to reduce the aperture thereof, an adjustment for predetermining a reduced aperture during the exposure, means for setting said diaphragm at a greater aperture to give fuller illumination during focusing, and a controller, released before but operated at one movement with the displacement of said member of the focusing mechanism, to actuate the reducing means instantly after the focusing and before the exposure, substantially as specified.

6. In a photographic camera, in combination, focusing mechanism having a displaceable member adapted to direct the image from the lens into a plane apart from the plane of the sensitized surface, mechanism for exposing the sensitized surface, an adjustable diaphragm, means adapted to reduce the aperture thereof, an adjustment for predetermining a reduced aperture during the exposure, means for setting said diaphragm at a greater aperture to give fuller illumination during focusing, and a controller, released before but operated by the displacement of said member of the focusing mechanism, to actuate the reducing means instantly after the focusing and before the exposure, substantially as specified.

7. In a photographic camera, in combination, focusing mechanism having a displaceable mirror adapted to reflect the image from the lens into a plane apart from the plane of the sensitized surface, mechanism for exposing the sensitized surface and actuated by the tripping of said focusing mirror, an adjustable diaphragm, means adapted to reduce the aperture thereof, an adjustment for predetermining a reduced aperture during the exposure, means for setting said diaphragm at a greater aperture to give fuller illumination during focusing, and a controller, released before the displacement but operated at one movement with the tripping of the focusing mirror, to actuate the reducing means instantly after the focusing and before the exposure, substantially as specified.

8. In a photographic camera, in combination, focusing mechanism having a displaceable mirror adapted to reflect the image from the lens into a plane apart from the plane of the sensitized surface, mechanism for exposing the sensitized surface and actuated by the tripping of said focusing mirror, an adjustable diaphragm, means adapted to reduce the aperture thereof, means for setting said diaphragm at a greater aperture to give fuller illumination during focusing, and a controller, released before the displacement but operated by the tripping of the focusing mirror, to actuate the reducing means instantly after the focusing and before the exposure, substantially as specified.

9. In a photographic camera, in combination, an adjustable iris diaphragm, spring-controlled means adapted to reduce the aperture thereof, a movable stop for predetermining the reduction of aperture by said spring-controlled reducing means, a trigger-pawl for engaging the movable adjusting member of the diaphragm to hold said diaphragm at a greater aperture to give fuller illumination during focusing, said automatic reducing mechanism being mounted on the barrel mounting of the lens and diaphragm and a controlling device consisting in trip mechanism in the body of the camera and a movable connection leading forward to the aforesaid trigger-pawl, substantially as specified.

10. In a photographic camera, in combination, a barrel mounting for the lens and diaphragm, an adjustable diaphragm, means adapted to reduce the aperture thereof, an adjustment for predetermining a reduced aperture during the exposure, means for setting said diaphragm at a greater aperture to give fuller illumination during focusing, the said reducing mechanism being mounted on the barrel mounting of the lens and diaphragm, and a controller, operating automatically as the focusing is effected, to actuate the reducing means instantly after the focusing and before the exposure, substantially as specified.

11. In a photographic camera, in combination, a barrel mounting for the lens and diaphragm, focusing mechanism having a displaceable member in the path of the rays from the lens, an adjustable diaphragm, means adapted to reduce the aperture thereof, an adjustment for predetermining a reduced aperture during the exposure, means for setting said diaphragm at a greater aperture to give fuller illumination during focusing, the said reducing mechanism being mounted on the barrel mounting of the lens and diaphragm, and a controller to actuate the reducing means instantly after the focusing and before the exposure, said controller being adapted to be operated by the same manual impulse that effects the displacement of said member of the focusing mechanism, substantially as specified.

12. In a photographic camera, in combination, a barrel mounting for the lens and diaphragm, focusing mechanism having a displaceable member in the path of the rays from the lens, an adjustable diaphragm, means adapted to reduce the aperture thereof, an adjustment for predetermining a reduced aperture during the exposure, means for setting said diaphragm at a greater aperture to give fuller illumination during focusing, the said reducing mechanism being mounted on the barrel mounting of the lens and diaphragm, and a controller, operated at one movement with the displacement of said member of the focusing mechanism, to actuate the reducing means instantly after the focusing and before the exposure, substantially as specified.

13. In a photographic camera, in combination, a barrel mounting for the lens and diaphragm, focusing mechanism having a displaceable member in the path of the rays from the lens, an adjustable diaphragm, means adapted to reduce the aperture thereof, an adjustment for predetermining a reduced aperture during the exposure, means for setting said diaphragm at a greater aperture to give fuller illumination during focusing, the said reducing mechanism being mounted on the barrel mounting of the lens and diaphragm, and a controller operated by the displacement of the said member of the focusing mechanism, to actuate the reducing means instantly after the focusing and before the exposure, substantially as specified.

14. In a photographic camera, in combination, a barrel mounting for the lens and diaphragm, focusing mechanism having a displaceable member adapted to direct the image from the lens into a plane apart from the plane of the sensitized surface, mechanism for exposing the sensitized surface, an adjustable diaphragm, means adapted to reduce the aperture thereof, an adjustment for predetermining the reduced aperture during the exposure, means for setting said diaphragm at a greater aperture to give fuller illumination during focusing, the said reducing mechanism being mounted on the barrel mounting of the lens and diaphragm, and a controller, operated at one movement with the displacement of said member of the focusing mechanism, to actuate the reducing means instantly after the focusing and before the exposure, substantially as specified.

15. In a photographic camera, in combination, a barrel mounting for the lens and diaphragm, focusing mechanism having a displaceable member adapted to direct the image from the lens into a plane apart from the plane of the sensitized surface, mechanism for exposing the sensitized surface, an adjustable diaphragm, means adapted to reduce the aperture thereof, an adjustment for predetermining a reduced aperture during the exposure, means for setting said diaphragm at a greater aperture to give fuller illumination during focusing, the said reducing mechanism being mounted on the barrel mounting of the lens and diaphragm, and a controller, operated by the displacement of said member of the focusing mechanism, to actuate the reducing means instantly after the focusing and before the exposure, substantially as specified.

16. In a photographic camera, in combination, a barrel mounting for the lens and diaphragm, focusing mechanism having a displaceable mirror adapted to reflect the image from the lens into a plane apart from the plane of the sensitized surface, mechanism for exposing the sensitized surface and actuated by the tripping of said focusing mirror, an adjustable diaphragm, means adapted to reduce the aperture thereof, an adjustment for predetermining a reduced aperture during the exposure, means for setting said diaphragm at a greater aperture to give fuller illumination during focusing, the said reducing mechanism being mounted on the barrel mounting of the lens and diaphragm, and a controller, operated at one movement with the tripping of the focusing mirror, to actuate the reducing means instantly after the focusing and before the exposure, substantially as specified.

17. In a photographic camera, in combination, a barrel mounting for the lens and diaphragm, focusing mechanism having a displaceable mirror adapted to reflect the image from the lens into a plane apart from the plane of the sensitized surface, mechanism for exposing the sensitized surface and actuated by the tripping of said focusing mirror, an adjustable diaphragm, means adapted to reduce the aperture thereof, means for setting said diaphragm at a greater aperture to give fuller illumination during focusing, the said reducing mechanism being mounted on the barrel mounting of the lens and diaphragm, and a controller, operated by the tripping of the focusing mirror, to actuate the reducing means instantly after the focusing and before the exposure, substantially as specified.

DORR E. FELT.

Witnesses:
H. M. MUNDAY,
PEARL ABRAMS.